(12) United States Patent
Olszewski

(10) Patent No.: US 8,931,973 B2
(45) Date of Patent: Jan. 13, 2015

(54) ARRANGEMENT AND METHOD FOR CONNECTING AN ACCESSORY PART TO AN OPERATING TABLE

(75) Inventor: Jan Donat Olszewski, Rastatt (DE)

(73) Assignee: Maquet GmbH & Co. KG, Rastatt (DE)

( * ) Notice: Subject to any disclaimer, the term of this patent is extended or adjusted under 35 U.S.C. 154(b) by 423 days.

(21) Appl. No.: 12/947,345

(22) Filed: Nov. 16, 2010

(65) Prior Publication Data

US 2011/0113558 A1    May 19, 2011

(30) Foreign Application Priority Data

Nov. 19, 2009  (DE) .......................... 10 2009 053 966

(51) Int. Cl.
| | | |
|---|---|---|
| *F16B 7/20* | (2006.01) | |
| *B25G 3/16* | (2006.01) | |
| *F16B 5/10* | (2006.01) | |
| *A61G 13/10* | (2006.01) | |
| *F16B 21/04* | (2006.01) | |

(52) U.S. Cl.
CPC ................. *F16B 5/10* (2013.01); *A61G 13/101* (2013.01); *F16B 7/20* (2013.10); *F16B 21/04* (2013.01)
USPC ........ 403/349; 403/109.3; 403/327; 403/348; 5/658; 285/396

(58) Field of Classification Search
USPC .......... 403/109.1, 109.2, 109.6, 109.8, 322.4, 403/330, 349, 354, 109.3, 109.5, 327, 348; 5/613, 658; 285/361, 396, 402
See application file for complete search history.

(56) References Cited

U.S. PATENT DOCUMENTS

| | | | | |
|---|---|---|---|---|
| 931,327 | A * | 8/1909 | Manzel ........................... | 279/93 |
| 1,494,859 | A * | 5/1924 | Miller et al. .................... | 279/93 |
| 2,076,918 | A * | 4/1937 | Robison .......................... | 285/82 |
| 3,362,050 | A * | 1/1968 | McCarthy ....................... | 24/656 |

(Continued)

FOREIGN PATENT DOCUMENTS

| | | |
|---|---|---|
| CN | 1452699 A | 10/2003 |
| DE | 1331568 | 3/1935 |

(Continued)

OTHER PUBLICATIONS

Office Action from corresponding Chinese Application No. 201010553937.3 dated Jun. 30, 2014.

*Primary Examiner* — Joshua Kennedy
*Assistant Examiner* — Matthew R McMahon
(74) *Attorney, Agent, or Firm* — McCormick, Paulding & Huber LLP

(57) ABSTRACT

An accessory part to be connected to an operating table has a connecting element (12, 16) and a component part of the operating table has a receiving area (14) for receiving at least an area of the connecting element (12, 16). An engagement element (22, 24) projects laterally from the connecting element (12, 16). The receiving area (14) has at least one guideway (18, 20) with which the engagement element (22, 24) engages during insertion of at least an area of the connecting element (12, 16) into the receiving area (14). When deformed, an elastically deformable element (52) exerts a force on the engagement element (22, 24). By the force exerted on the engagement element (22, 24) and by the course of the guideway (18, 20) a force ($F_A$) is exerted in the direction of insertion (P2) on the connecting element (12, 16) when the accessory part and the operating table are connected.

8 Claims, 11 Drawing Sheets

(56) References Cited

U.S. PATENT DOCUMENTS

| | | | |
|---|---|---|---|
| 4,547,092 A | 10/1985 | Vetter et al. | |
| 4,550,715 A * | 11/1985 | Santangelo et al. | 600/114 |
| 4,896,986 A * | 1/1990 | Terayama | 403/14 |
| 4,906,147 A | 3/1990 | Friesinger et al. | |
| 4,943,182 A | 7/1990 | Hoblingre | |
| 5,464,301 A * | 11/1995 | Kramer | 403/322.3 |
| 5,741,084 A * | 4/1998 | Del Rio et al. | 403/349 |
| 6,038,718 A * | 3/2000 | Pennington et al. | 5/618 |
| 6,484,334 B1 * | 11/2002 | Borders et al. | 5/600 |
| 6,733,202 B2 * | 5/2004 | Couture et al. | 403/348 |
| 6,796,529 B1 * | 9/2004 | Duran et al. | 244/129.5 |
| 6,862,759 B2 * | 3/2005 | Hand et al. | 5/430 |
| 6,863,465 B2 * | 3/2005 | Brancheriau | 403/348 |
| 7,021,817 B2 * | 4/2006 | Huang et al. | 366/331 |
| 7,810,185 B2 | 10/2010 | Bürstner et al. | |
| 7,992,279 B2 * | 8/2011 | Caveney et al. | 29/450 |
| 2009/0208282 A1 * | 8/2009 | Hale | 403/349 |

FOREIGN PATENT DOCUMENTS

| | | |
|---|---|---|
| DE | 8715181 U1 | 12/1987 |
| DE | 68903350 T2 | 3/1993 |
| DE | 299 20 679 U1 | 2/2000 |
| EP | 1785119 A1 | 5/2007 |
| EP | 2 106 778 A2 | 7/2009 |
| FR | 2 713 725 A1 | 6/1995 |
| JP | 61-186178 A | 8/1986 |
| JP | 2004509295 A | 3/2004 |
| WO | 02/23057 A1 | 3/2002 |

\* cited by examiner

ARRANGEMENT AND METHOD FOR CONNECTING AN ACCESSORY PART TO AN OPERATING TABLE

CROSS REFERENCE TO RELATED APPLICATIONS

Applicant hereby claims foreign priority benefits under U.S.C. §119 from German Patent Application No. 10 2009 053 966.2 filed on Nov. 19, 2009, the contents of which are incorporated by reference herein.

TECHNICAL FIELD

The invention relates to an arrangement and a method for connecting an accessory part to an operating table. A large number of different accessory parts can be connected to known operating tables via at least one releasable connection each. Such accessory parts are in particular head plates, head clamps, leg plates, extension aggregates as well as lateral extensions of the lying surfaces.

BACKGROUND OF THE INVENTION

From the document EP 1 785 119 B1 an operating table is known in which accessory parts referred to as segments are connected to the operating table. With the aid of accessory parts, operating tables can be adapted to the planned operation and/or to the specific patient to be operated.

Known accessory parts for operating tables have the disadvantage that the mounting of the respective accessory part has to be done in several handling steps or, as far as releasable snap-in connections are concerned, these connections are not free of play. Rather, the play in the connection has to be removed by a further operation such as the turning of a knurled screw or the like.

SUMMARY OF THE INVENTION

Starting out from this prior art, the invention is based on the object to specify an arrangement and a method for connecting an accessory part to an operating table, in which method the connection between the accessory part and the operating table can be easily established, and a play between the accessory part and the operating table is avoided.

This object is solved by an arrangement for connecting an accessory part to an operating table, wherein the accessory part has a connecting element and wherein a component part of the operating table has a receiving area for receiving at least an area of the connecting element. An engagement element projects laterally from the connecting element, in that the receiving area has a guideway with which the engagement element engages during insertion of at least an area of the connecting element into the receiving area. An elastically deformable element, when deformed, exerts a force on the engagement element. By means of the force exerted on the engagement element and by the course of the guideway, a force $F_A$ acts in the direction of insertion (P2) on the connecting element when the accessory part and the operating table are connected. The object is also solved by a method for connecting an accessory part to an operating table, wherein a connecting element of the accessory part is inserted into a receiving area provided in a component part of the operating table. The receiving area receives at least an area of the connecting element for connecting the accessory part to the operating table. During insertion of at least an area of the connecting element into the receiving area, an engagement element projecting laterally from the connecting element engages with a guideway of the receiving area. An elastically deformable element is elastically deformed, a force being exerted on the engagement element by the elastically deformed element. By means of the force exerted on the engagement element and by the course of the guideway, a force ($F_A$) acting in the direction of insertion (P2) is exerted on the connecting element when the accessory part and the operating table are connected.

In the arrangement and method, by means of the force exerted on the engagement element and by the course of the guideway provided in the receiving area a force acting in the direction of insertion is exerted on the connecting element when the accessory part and the operating table are connected. By means of this force, a play between the connecting element and the receiving area and thus between the accessory part and the operating table can be avoided. In general, the freedom of motion between two engaging parts is regarded as play, in the present case the freedom of motion between the connecting element and the receiving area or, respectively, between the accessory part and the operating table.

When, in a development, a stop element is provided which prevents a further movement of the connecting element in the direction of insertion in the connected state, the force acting in the direction of insertion causes that the connecting element is pressed with this force against the stop and, as a result thereof, a play which might exist between the connecting element and the receiving area is removed.

It is advantageous to form the connecting element as a pin and the receiving area as a bushing. The pin can then be inserted into the bushing. In a preferred embodiment, the end of the pin to be inserted into the bushing is tapered, for example in the form of a circumferential chamfer. By tapering the end, the insertion of the connecting element into the bushing is made easier. As a result thereof, an easy handling of the accessory part during connection to the operating table is achieved.

The stop can, for example, be formed by a first contact area of the connecting element and/or of the accessory part and by a second contact area of the receiving area and/or of the operating table, wherein the force acting in the direction of insertion on the connecting element presses the first contact area against the second contact area. Here, one of the contact areas can be formed by at least a part of the circumferential surface of a conical frustum, the longitudinal axis of which runs parallel to the direction of insertion. In a connected state of the accessory part and the operating table, the respective other contact area is, at least in a partial area, formed complementarily to the contact area formed by the circumferential surface of the conical frustum. Alternatively, in the connected state of the accessory part and the operating table, the respective other contact area can be formed as a cylindrical opening so that the contact area formed as a conical frustum is centered by the respective other contact area. When the contact area of the connecting element is located at the end of the connecting element that is inserted into the receiving area, the first or second contact area can also be formed as a cone which is received and centered in a conical, frusto-conical or cylindrical opening formed by the second contact area.

Further, it is advantageous when the guideway provided in the receiving area has a first rising area by which, upon insertion of the connecting element into the receiving area, a rotation of the engagement element about an axis of rotation running parallel to the direction of insertion takes place in a first direction of rotation, the elastically deformable element being deformed during rotation of the engagement element in the first direction of rotation. The guideway preferably has a second falling area by which the engagement element, after passing the first area, is rotated in a second direction of rotation opposite to the first direction of rotation. Here, the elastically deformed element exerts a force on the receiving area via the engagement element and the guideway. This force can be split up into an axial force in the direction of insertion and a radial force in the second direction of rotation. By means of the force acting in the direction of insertion the connecting element is held in the receiving area and/or pulled into the receiving area. As a result thereof, a reliable holding of the connecting element in the receiving area is achieved and a play between the connecting element and the receiving area is avoided.

It is particularly advantageous when an element is provided which prevents a rotation of the connecting element relative to the receiving area. As a result thereof, it is guaranteed that no rotation of the connecting element itself occurs during insertion into the receiving area but only a rotation of the engagement element relative to the rest of the connecting element and/or to the accessory part so that the elastic element is already deformed during insertion of the connecting element into the receiving area.

The elastic element can, in particular, be a spring, such as a torsion spring, which is biased during insertion of the connecting element into the receiving area or, alternatively, is biased by a rotation of the connecting element following the insertion of the connecting element into the receiving area.

In a preferred embodiment, the element that prevents a rotation of the connecting element relative to the receiving area is formed by at least a second connecting element connected to the accessory part as well as by a second receiving area formed in the component part of the operating table or in a further component part of the operating table.

In an alternative development, the element which prevents a rotation of the connecting element relative to the receiving area can comprise a further engagement element projecting laterally from the connecting element and a further guideway provided in the receiving area and extending in the direction of insertion.

Alternatively or additionally, a further engagement element can be provided which projects laterally from the receiving area. Upon insertion of the connecting element into the receiving area, then the engagement element engages with a guideway provided in the connecting element. The guideway extends parallel to the direction of insertion. As a result thereof, a rotation of the connecting element relative to the receiving area during insertion of the connecting element into the receiving area can be avoided so that the elastic element is already deformed during insertion of the connecting element into the receiving area. As a result thereof, the deformed elastic element exerts a force in the direction of insertion on the connecting element at least in the inserted state.

In a further embodiment of the invention, the guideway with which the engagement element engages has at least a falling area. During insertion of the connecting element into the receiving area, the engagement element is guided in the guideway. Upon insertion into the receiving area, the connecting element can be rotated relative to the receiving area about an axis of rotation arranged in parallel to the direction of insertion. The connecting element is preferably rotated together with the accessory part when the engagement element contacts the falling area of the guideway, as a result whereof the elastically deformable element is not or only slightly elastically deformed during insertion of the connecting element into the receiving area. Upon rotation of the connecting element in a first direction of rotation, after the engagement element has reached a position in which it contacts the falling area of the guideway, a deformation of the elastically deformable element takes place. After rotation of the connecting element, the accessory part and/or the connecting element are locked such that at least they cannot be rotated in a second direction of rotation opposite to the first direction of rotation. The elastically deformed element exerts a force on the guideway, by which a force acts in the direction of insertion on the connecting element. What is achieved hereby is that the elastically deformable element is deformed only after insertion of the connecting element into the receiving area so that dependent on the application an alternative embodiment of the invention as compared to the first embodiment is made available, in which the elastically deformable element is elastically deformed already during insertion of the connecting element into the receiving area, while the engagement element engages with the guideway in the rising area thereof during insertion.

In a further preferred embodiment of the invention at least two engagement elements are provided which project from the connecting element on opposite sides. The engagement elements are preferably formed by a component part, for example by a cylindrical pin which is guided radially through the connecting element so that the ends of the cylindrical pin project from the connecting element on opposite sides thereof.

Further, it is advantageous when the engagement elements projecting from opposite sides each engage with one guideway so that as many guideways are provided as there are projecting engagement elements. In the case of two engagement elements, thus two guideways are provided. Each of the guideways has at least a falling area and preferably in addition a rising area, as already explained in every detail further above.

In a further preferred embodiment of the invention, a lever is provided which is connected to the engagement element and/or the engagement elements in a rotationally fixed manner. For releasing the connection between the connecting element and the receiving area, the engagement element can be rotated in the first direction of rotation with the aid of the lever so that, upon actuation of the lever, the connecting element can be moved out of the receiving area opposite to the direction of insertion. As a result thereof, the connection between the accessory part and the operating table can be released easily.

In a further preferred embodiment, the accessory part has two connecting elements and the component part of the operating table has two receiving areas for receiving at least an area of one of the connecting elements each. Each connecting element comprises at least one engagement element which is each connected to a lever in a rotationally fixed manner. With the aid of the lever, the engagement elements are each rotatable opposite to the force generated by the elastically deformable element. In particular, upon actuation of the lever, the elastically deformable element is elastically deformed or further elastically deformed. The guideways, levers, rotation ranges of the engagement elements can here be provided such that, when the at least two connecting elements are arranged next to one another and the receiving areas are correspondingly arranged next to one another, a rotation required by the lever for releasing the left-hand connection takes place clockwise, i.e. in the mathematically negative sense of rotation, and for releasing the right-hand connection the lever of the right-hand connection arrangement is rotated anti-clockwise, i.e. in the mathematically positive sense of rotation. By opposite directions of rotation of the levers for releasing the two connecting arrangements an easy handling of the accessory part is possible. In particular, a lateral access to the levers can be provided so that an operator reaches under the accessory part and pulls the levers, which preferably project downwardly in the connected state, away from one another in opposite directions so that a corresponding rotation of the levers for releasing the two connections takes place.

By pivoting the levers, the connecting elements can be easily moved or pulled out of the receiving areas.

In this connection, it is advantageous when the axes of rotation of the levers extend in parallel, and the levers are rotated at least in opposite directions of rotation to move the connecting elements out of the receiving areas.

With an opposite direction of rotation, the levers can be used to increase the force generated by the elastically deformed element, which force is introduced via the respective engagement element and the guideway and which causes a force in the direction of insertion. As a result thereof, a play which might still exist and which is not removed solely by the force caused by the elastically deformed element in the direction of insertion can be reduced or removed by the additional force in the direction of insertion generated with the aid of the lever.

Further, it is advantageous when the operating table has a column on which an adjustable table plate can be releasably mounted. The table plate preferably has a support surface for supporting a patient. Further, the operating table has a device for pivoting the table plate. The receiving area for receiving the connecting element is preferably formed in the table plate or in an element connected to the table plate.

As already mentioned at the beginning, the accessory part can generally comprise head support accessories (such as a head clamp, a head plate etc.), a leg plate, an extension aggregate and/or a back plate.

The method having the features of an independent method claim can be developed in the same manner as specified for the inventive arrangement. In particular, the method for connecting an accessory part to an operating table can be developed with the features of the dependent claims or respective method steps.

BRIEF DESCRIPTION OF THE DRAWINGS

Further features and advantages of the invention result from the following description which in connection with the enclosed figures explains the invention with reference to embodiments.

DETAILED DESCRIPTION OF THE PREFERRED EMBODIMENT

Figure 1:
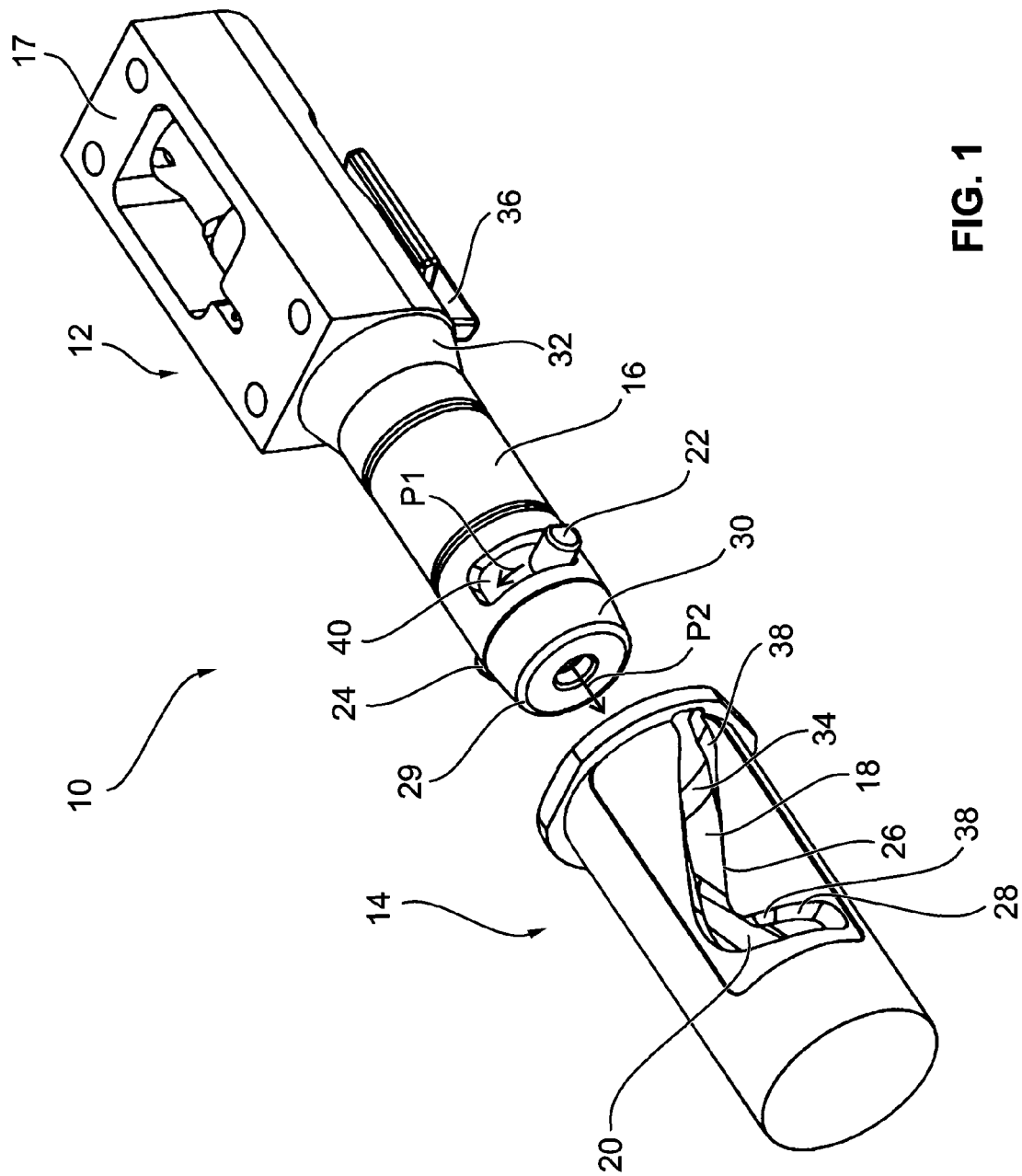
FIG. 1 shows a schematic perspective illustration of an arrangement for connecting an accessory part to an operating table in a separated state.

In FIG. 1, a schematic perspective illustration of an inventive connecting arrangement 10 is illustrated. The connecting arrangement 10 comprises a first connecting element 12 and a second connecting element 14. In this embodiment, the connecting element 12 is connected via a flange plate 17 to a non-illustrated accessory part, in particular to a head plate to be connected to an operating table. In the present embodiment, the second connecting element 14 is placed in a table plate forming an operating table support surface. Preferably, the second connecting element 14 is placed in a frontal opening of the table plate and is preferably adhered, screwed or connected in an otherwise suitable manner to the table plate thereat. Alternatively, the second connecting element 14 can be formed as a corresponding opening with guideways or guide grooves, without a separate component part, such as the connecting element 14, having to be provided. In the present embodiment, the connecting element 14 is formed as a bushing 14 into which a connecting pin 16 of the first connecting element 12 can be inserted. In the side walls of the cylindrical area of the bushing 14 two guideways 18, 20 are formed opposite to each other, with which opposite engagement elements 22, 24 projecting laterally from the connecting pin 16 engage during insertion of the connecting pin 16 into the bushing 14.

The opposite guideways 18, 20 each have an inclined rising area 26 and an inclined falling area 28. During insertion of the connecting pin 16 into the bushing 14, a rotation of the connecting pin 16 relative to the bushing 14 is prevented by non-illustrated means so that the engagement elements 22, 24 are rotated in the direction of rotation of the arrow P1 by the inclined rising area and, after reaching the inclined falling area 28, are rotated opposite to the direction of rotation of the arrow P1. Upon rotation of the engagement elements 22, 24 in the direction of the arrow P1, an elastic element (not illustrated) arranged inside the connecting pin 16 is elastically deformed and exerts a force directed opposite to the direction of the arrow P1 on the engagement elements 22, 24 by the elastic deformation.

At its front end viewed in the direction of insertion, the connecting pin 16 has a chamfer 29 and a conical area 30 which each make the insertion of the connecting pin 16 into the bushing 14 easier. At the opposite end of the connecting pin 16, a conical, in the present embodiment a specifically frusto-conical area 32 is provided which, in the connected state of the first connecting element 12 and the second connecting element 14, at least partly rests against a contact area 34 of the second connecting element 14 that is formed complementarily at least in a partial area, and contacts this contact area. As a result thereof, the position of the first connecting element 12 relative to the second connecting element 14 is precisely defined when a force acts in the direction of insertion P2 on the first connecting element 12 in the case of an established connection between the first and the second connecting element 12, 14.

The first connecting element 12 further has an actuating lever 36 which in the present embodiment is connected to the engagement elements 22, 24 in a rotationally fixed manner. By actuating the actuating lever 36, the engagement elements 22, 24 are rotated from the position illustrated in FIG. 1 in the direction of the arrow P1 or, given another position of the engagement elements 22, 24, opposite to the direction of the arrow P1. The engagement elements 22, 24 project through a longitudinal opening 40 which is provided in the circumferential surface of the cylindrical portion of the connecting pin 16. The longitudinal opening 40 limits the possible range of rotation of the engagement elements 22, 24.

Figure 2:
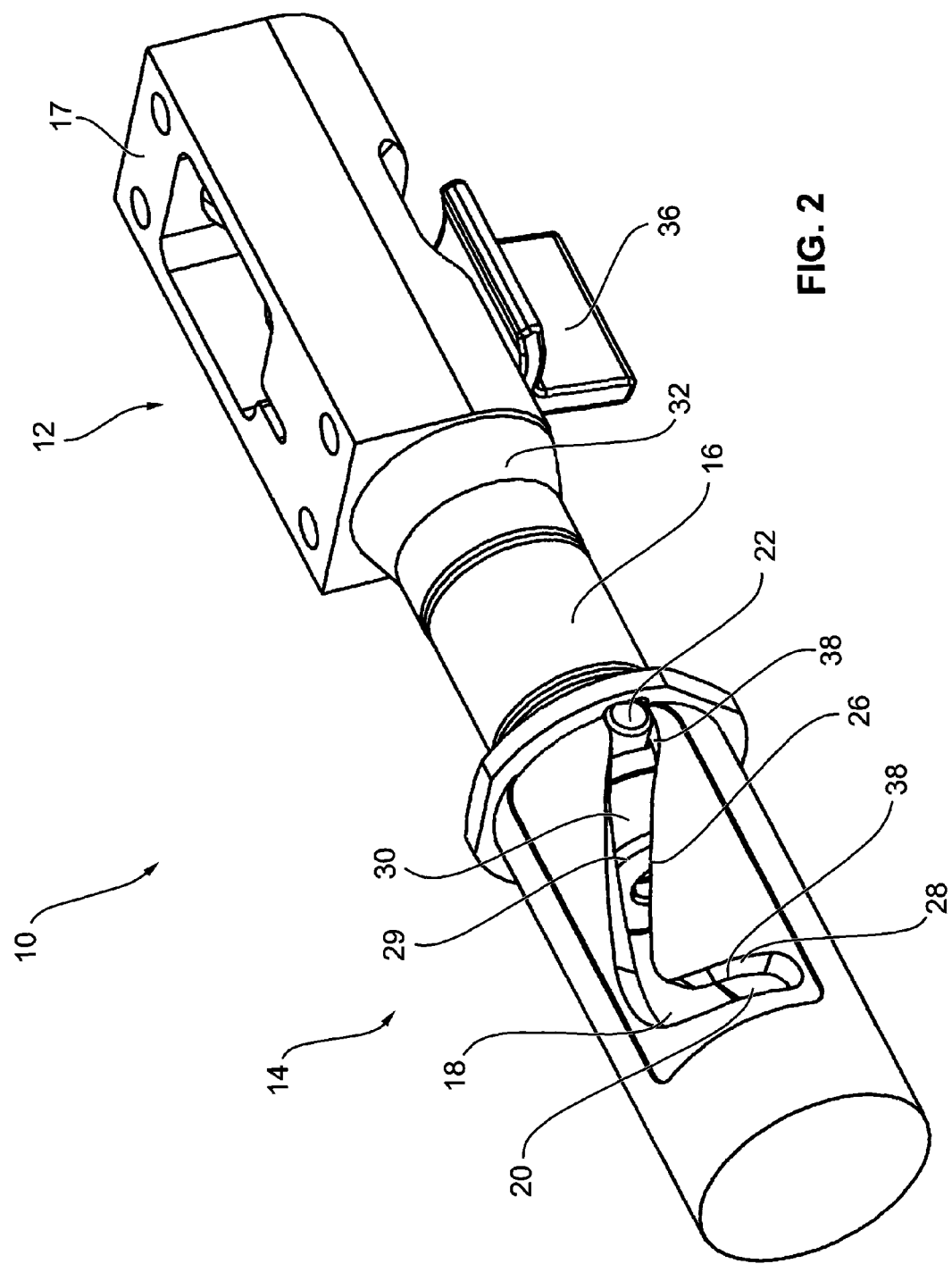
FIG. 2 shows a further schematic perspective illustration of the arrangement according to FIG. 1 during establishment of the connection in a first position.

In FIG. 2, a further schematic perspective illustration of the arrangement 10 according to FIG. 1 during establishment of the connection in a first connecting position is illustrated. In contrast to the position of the first connecting element 12 and the second connecting element 14 shown in FIG. 1, the front area of the connecting pin 16 is already inserted into the bushing 14 and the engagement elements 22, 24 already engage with the guideways 18, 20. In this position, the engagement elements 22, 24 are however still in the end position shown in FIG. 1 and have not yet been moved in the direction of the arrow P1. As already mentioned, the engagement elements 22, 24 are engaged with an elastically deformable element, such as a spring, which is preferably already deformed or biased in the position of the engagement elements 22, 24 shown in FIG. 1 so that by means of the force exerted by the elastically deformed element on the engagement elements 22, 24, the latter are kept in the position shown in FIG. 1.

Figure 3:
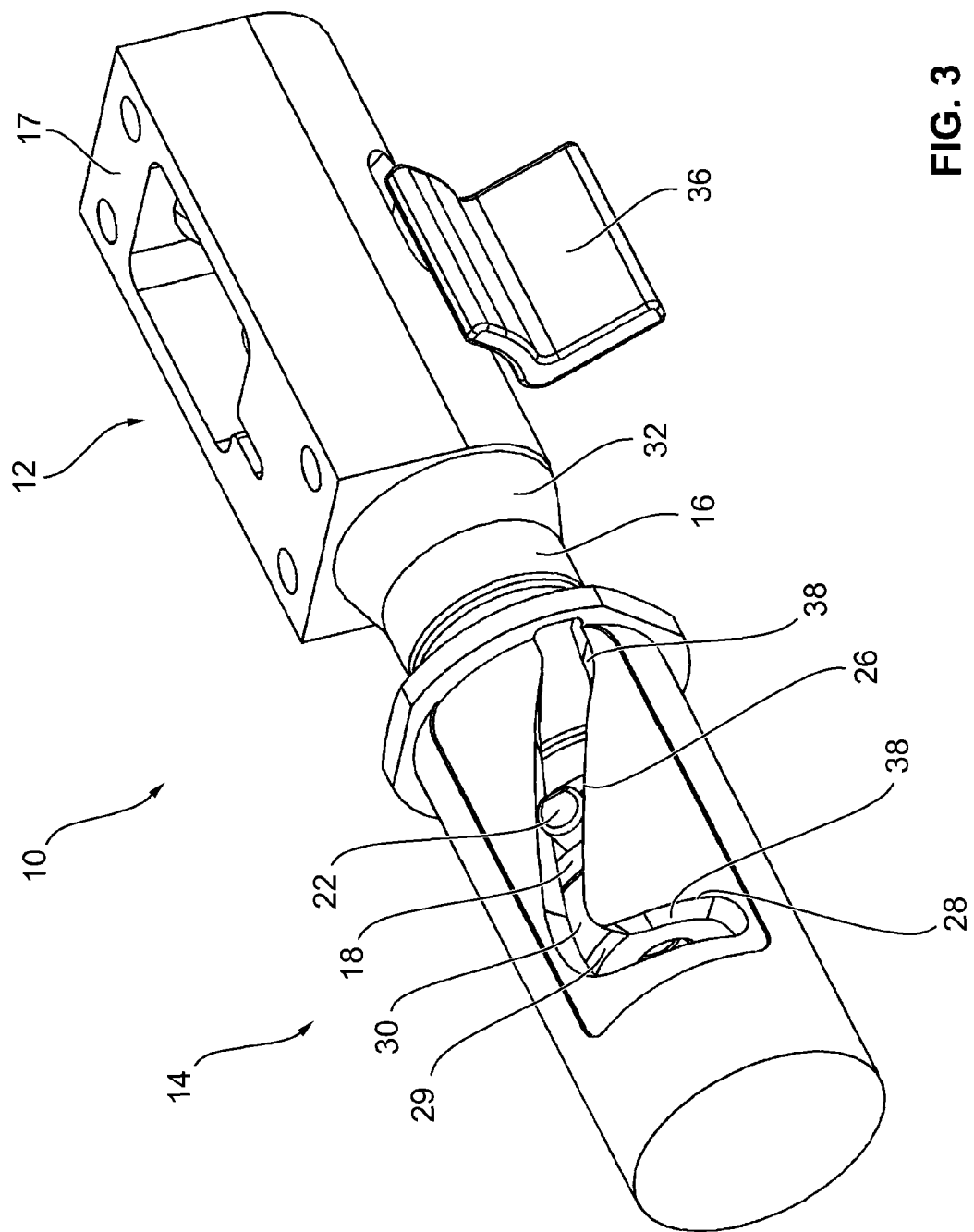
FIG. 3 shows a further schematic perspective illustration of the arrangement according to FIGS. 1 and 2 during establishment of a connection in a second position.

In FIG. 3, a further schematic perspective illustration of the arrangement 10 according to FIGS. 1 and 2 during establishment of the connection between the first connecting element 12 and the second connecting element 14 is illustrated. Here, the connecting pin 16 of the first connecting element 12 has been inserted further into the bushing 14 so that the engagement elements 22, 24 are guided along the inclined rising areas 26 of the guideways 18, 20. As already mentioned, a rotation of the first connecting element 12 relative to the second connecting element 14 is prevented by further non-illustrated elements so that the engagement elements 22, 24, when they slide along the inclined rising areas 26 of the guideways 18, 20, are rotated in the direction of the arrow P1 during insertion of the connecting pin into the bushing 14. By the rotation of the engagement elements 22, 24 about the central axis of the cylindrical connecting pin 16 the engagement elements 22, 24 are rotated in the direction of the arrow P1. By means of this rotation, the elastically deformable element is deformed or deformed further so that the force exerted on the engagement elements 22, 24 by the elastically deformed element increases the further the engagement elements 22, 24 are guided along the inclined rising areas 26 of the guideways 18, 20 in the direction of insertion P2. The rotation of the engagement elements 22, 24 in the direction of the arrow P1 during insertion of the connecting pin 16 into the bushing 14 also causes a pivoting of the actuating lever 36 since this lever is connected to the engagement elements 22, 24 in a rotationally fixed manner.

Figure 4:
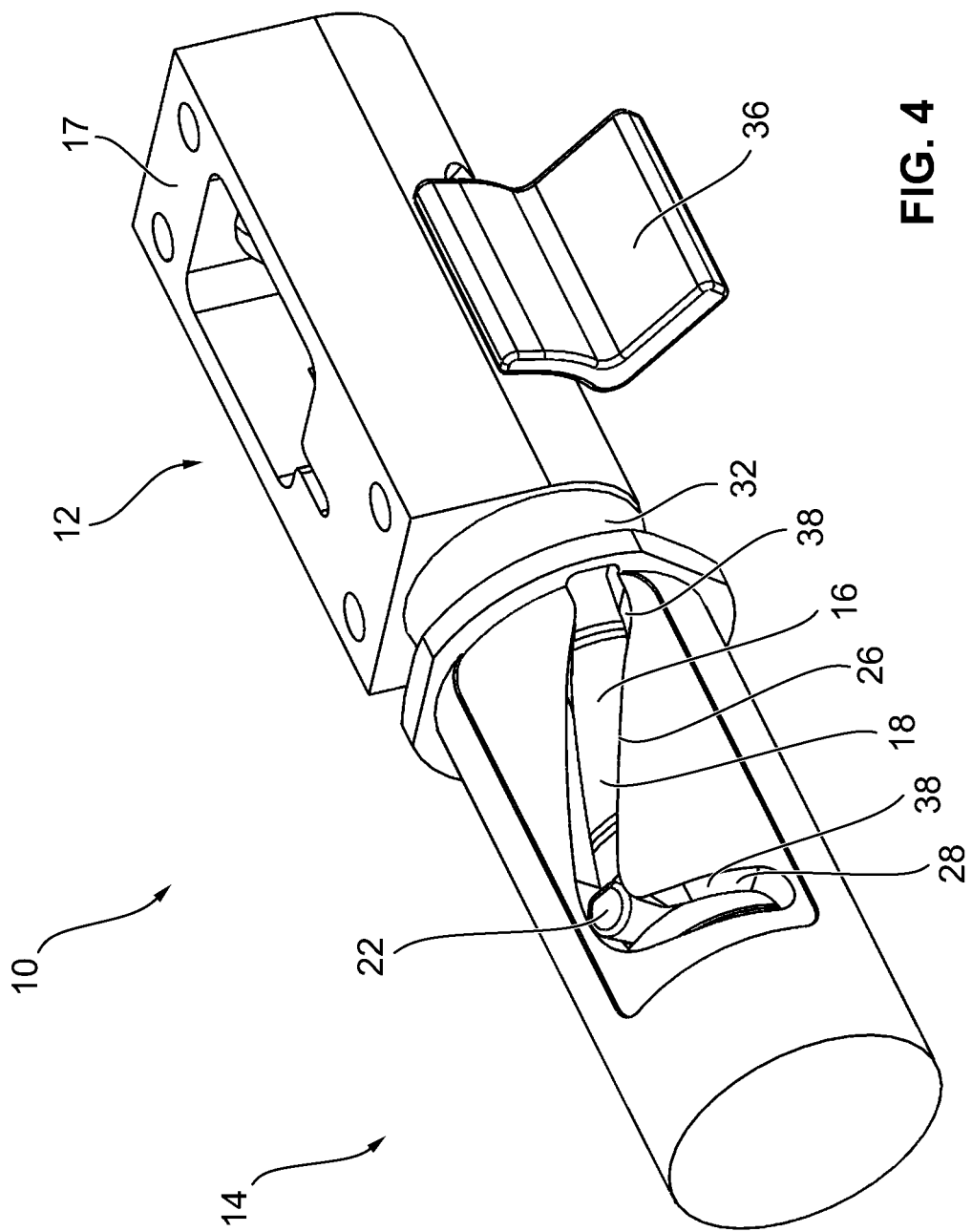
FIG. 4 shows a further schematic perspective illustration of the arrangement according to FIGS. 1 to 3 during establishment of a connection in a third position.

In FIG. 4, a further schematic perspective illustration of the arrangement 10 according to FIGS. 1 to 3 during establishment of the connection between the first connecting element 12 and the second connecting element 14 is shown. In contrast to the position illustrated in FIG. 3, the connecting pin 16 has been inserted further into the bushing 14 so that the engagement elements 22, 24 have been guided up to the end of the rising areas of the guideways 18, 20. In this position, the actuating lever 36 is maximally deflected.

Figure 5:
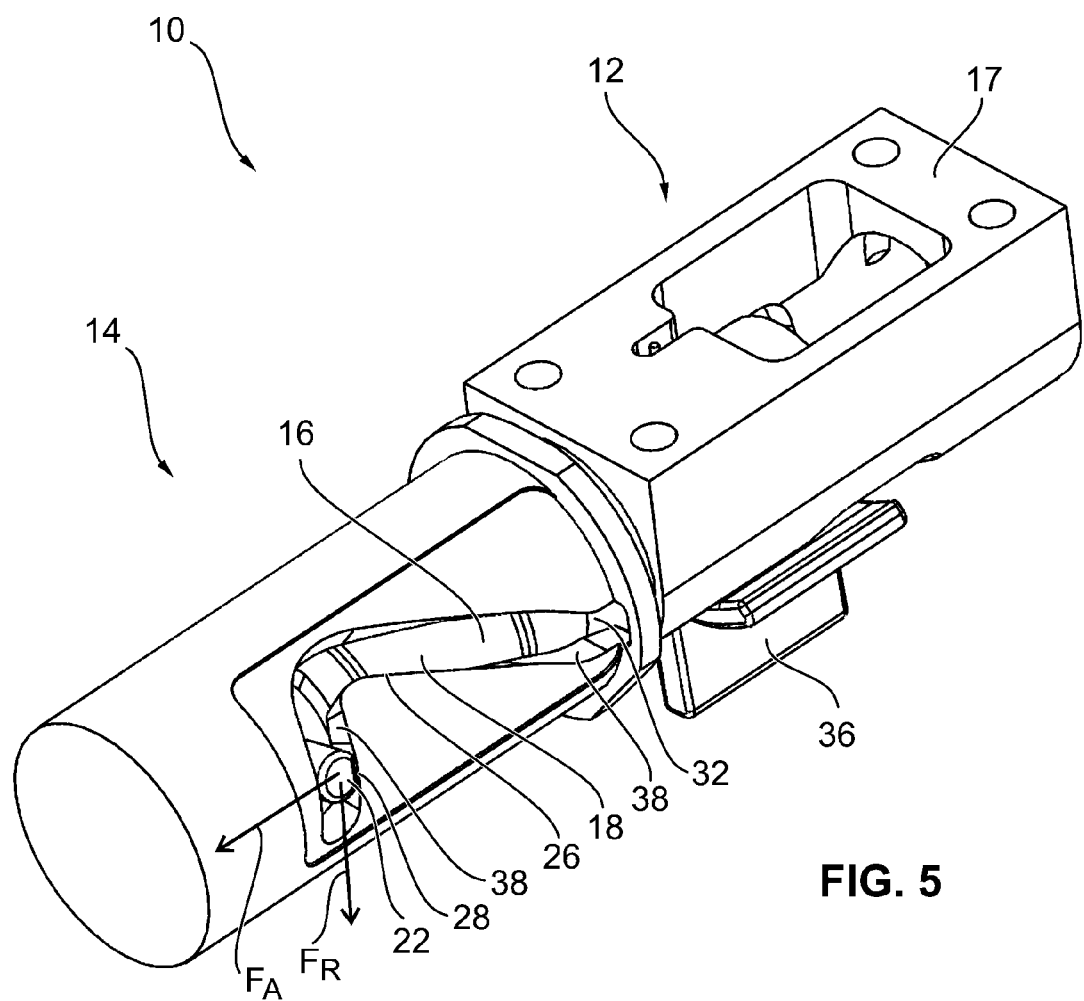
FIG. 5 shows a further schematic perspective illustration of the arrangement according to FIGS. 1 to 4 in the connected state.

In FIG. 5, a further schematic perspective illustration of the arrangement 10 according to FIGS. 1 to 4 is shown in a position in which the inventive connection between the first connecting element 12 and the second connecting element 14 is established. Compared with FIG. 4, the connecting pin 16 has been inserted further into the bushing 14. As a result thereof, the engagement elements 22, 24 have been guided further along the guideways 18, so that they have been guided along the inclined falling areas 28 of the guideways 18, 20 up to the position illustrated in FIG. 5. In this position, at least a part of the surface of the conical area 32 contacts the complementarily formed contact area 34.

Compared with FIG. 1, the engagement elements are rotated in the direction of the arrow P1 so that the elastically deformable element is elastically deformed and exerts a force on the engagement elements 22, 24 opposite to the direction of the arrow P1. This force presses the engagement elements 22, 24 against the flank 38 of the guideways 18, 20 in the inclined falling area 28. This force acting on the inclined falling area 28 can be split up into a radial force component $F_R$ and into an axial force component $F_A$. The force component $F_A$ acts in the direction of insertion P2 on the connecting pin 16 and thus on the connecting element 12 so that the latter is pulled further into the bushing 14, the conical area 32 being pressed against the contact surface 34. As a result thereof, a play between the first connecting element 12 and the second connecting element 14 is avoided.

The force exerted by the engagement elements 22, 24 on the flank 38 in the inclined falling area 28 of the guideways 18, 20 can be increased by a short-time actuation of the actuating lever 36, as a result whereof the force $F_A$ is temporarily increased and a play which might still exist between the first connecting element 12 and the second connecting element 14 is removed. The force exerted on the engagement elements 22, 24 by the elastically deformed element is to be calculated at least such that the first connecting element 12 is reliably held in the second connecting element 14 without a force being exerted on the first connecting element 12 opposite to the direction of insertion P2 in the case of a designated use of the accessory part (not illustrated) and of the operating table (not illustrated) that is so high that a play again occurs between the first connecting element 12 and the second connecting element 14.

Figure 6:
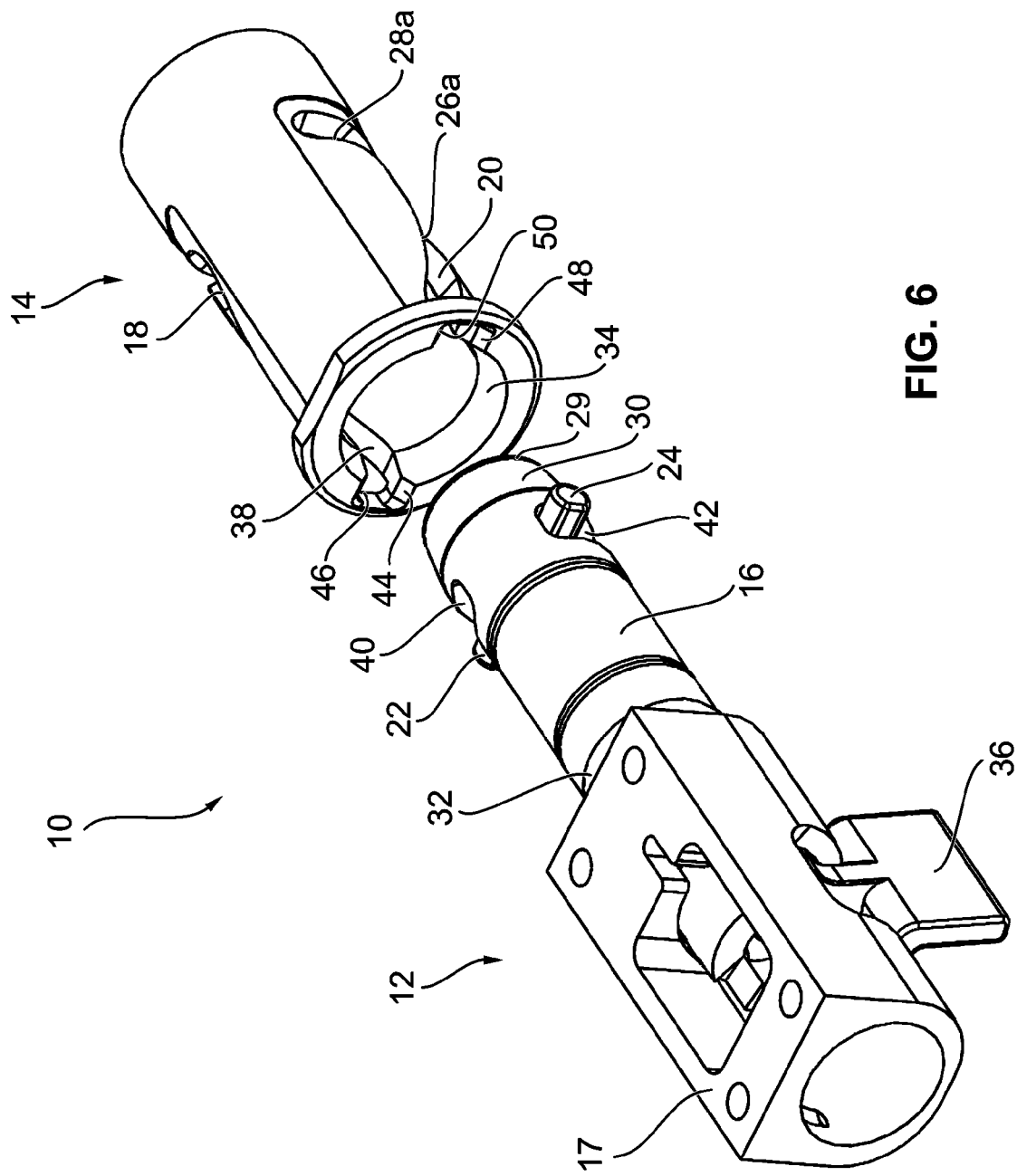
FIG. 6 shows a further schematic perspective illustration of the arrangement for connecting an accessory part to an operating table according to FIGS. 1 to 5 in a first separated position.

In FIG. 6, a further schematic perspective illustration of the arrangement 10 for connecting an accessory part to an operating table according to FIGS. 1 to 5 is illustrated in another perspective illustration. In this illustration, it can be seen that the engagement element 24 projects through an opening 42 in the cylindrical area of the connecting pin 16. Further, it can be seen in FIG. 6 that in the insertion area of the bushing 14 the guideways 18, 20 are made wider by slopes 44, 46, 48 and 50 so that the insertion of the engagement elements 22, 24 into the guideways 18, 20 is made easier.

Figure 7:
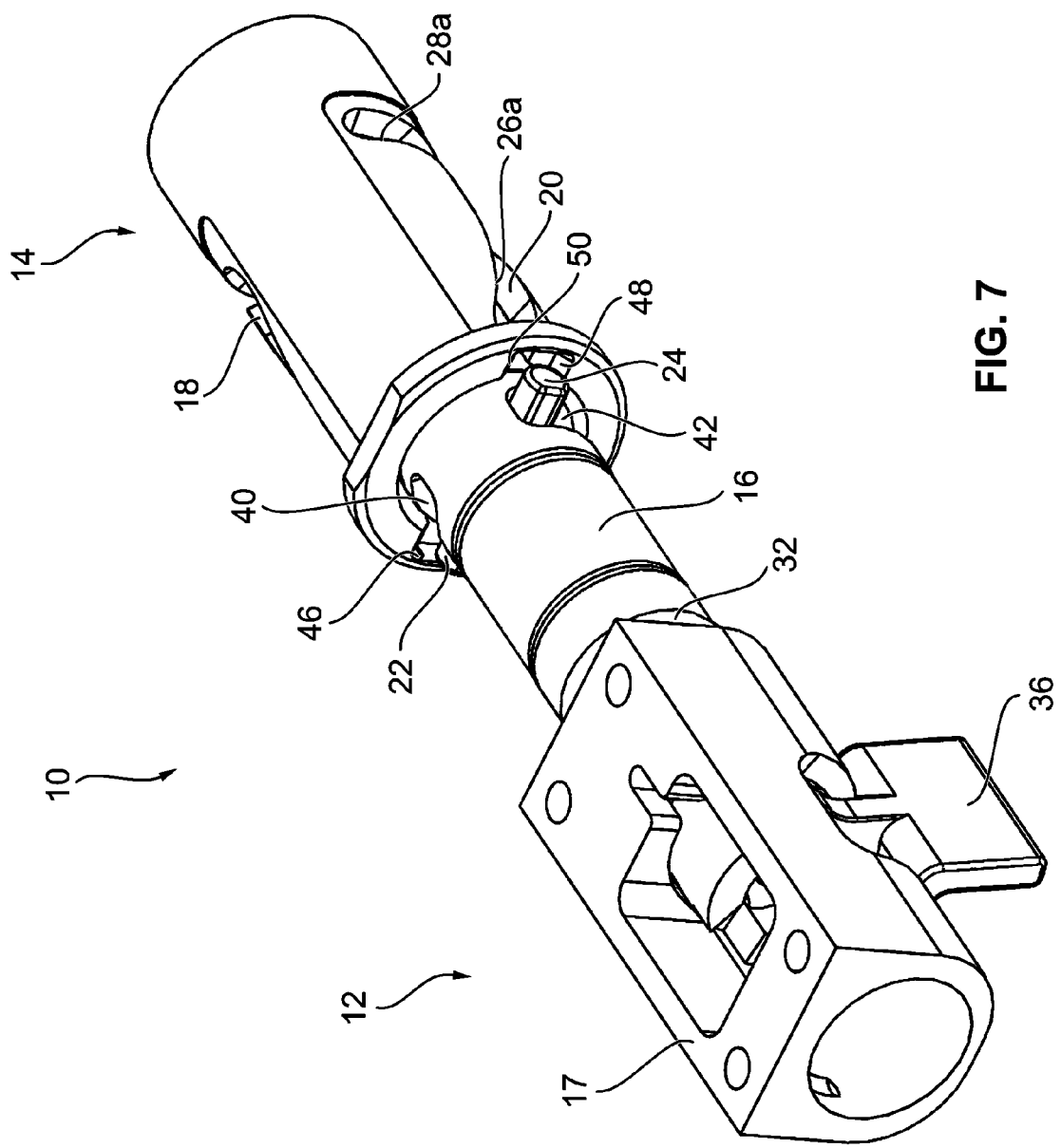
FIG. 7 shows a further schematic perspective illustration of the connecting arrangement according to FIGS. 1 to 6 during establishment of the connection.

In FIG. 7, a further schematic perspective illustration of the connecting arrangement 10 according to FIGS. 1 to 6 is illustrated, in which the conical area 30 of the connecting pin 16 has already been inserted into the bushing 14 and the engagement elements 22, 24 are still arranged outside the bushing 14 and thus are not yet engaged with the guideways 18, 20.

Figure 8:
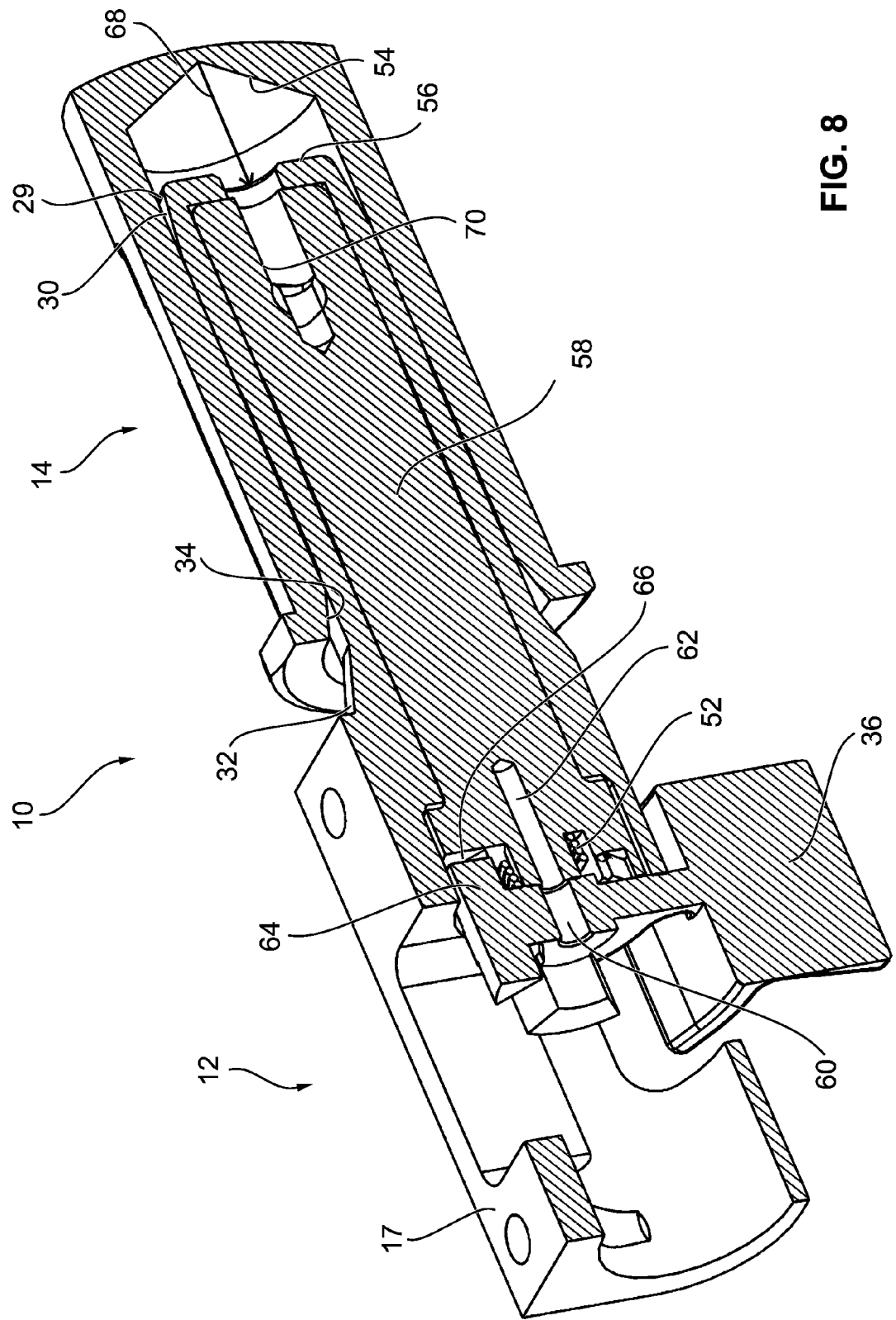
FIG. 8 shows a perspective sectional view of the arrangement according to FIGS. 1 to 7.

In FIG. 8, a perspective sectional view of the first connecting element 12 is shown. In this sectional illustration a spring 52 serving as an elastically deformable element is visible which is biased or further biased upon rotation of the engagement elements 22, 24 in the direction of the arrow P1. In the connected state, the conical area 32 and the complementary area 34 serve as a stop that prevents a further insertion of the connecting pin 16 into the bushing 14. Alternatively or additionally, such a stop can also be formed by the inner front area 54 and the front side 56 of the connecting pin 16. This stop can then be formed either as a mere longitudinal stop by way of a longitudinal boundary or, alternatively or additionally, by lateral contact points for centering the connecting pin 16 in the bushing 14.

The actuating lever 36 is, as already mentioned, connected to the engagement elements 22, 24 in a rotationally fixed manner. For this, the actuating lever 36 is connected to the inner cylinder 58 of the first connecting element 12 via a screw connection. For this, a through hole 60 is provided in the actuating lever 36 and in the inner cylinder 58 there is provided a blind hole 62 in which an internal thread is formed into which the threads of a non-illustrated screw which is guided through the through hole 60 are screwed. For a rotationally fixed connection, further an engagement element 64 of the actuating lever 36 engages with a complementary engagement aperture 66 of the inner cylinder 58.

In the present embodiment, the engagement elements 22, 24 are formed by a cylindrical pin which is inserted through a through hole formed transversely to the longitudinal axis of the inner cylinder 58. This cylindrical pin is fixed by a screw screwed through a through hole 68 in the outer connecting pin 16 and a thread provided in an inner hole 70 in the inner cylinder 58, the front end side of the non-illustrated screw pressing against the cylindrical pin of the engagement elements 22, 24 and fixes it in the inner cylinder 58. By the simple structure of the first connecting element 12 shown in FIG. 8, also an easy and cost-efficient mounting of the connecting element 12 is possible.

Figure 9:
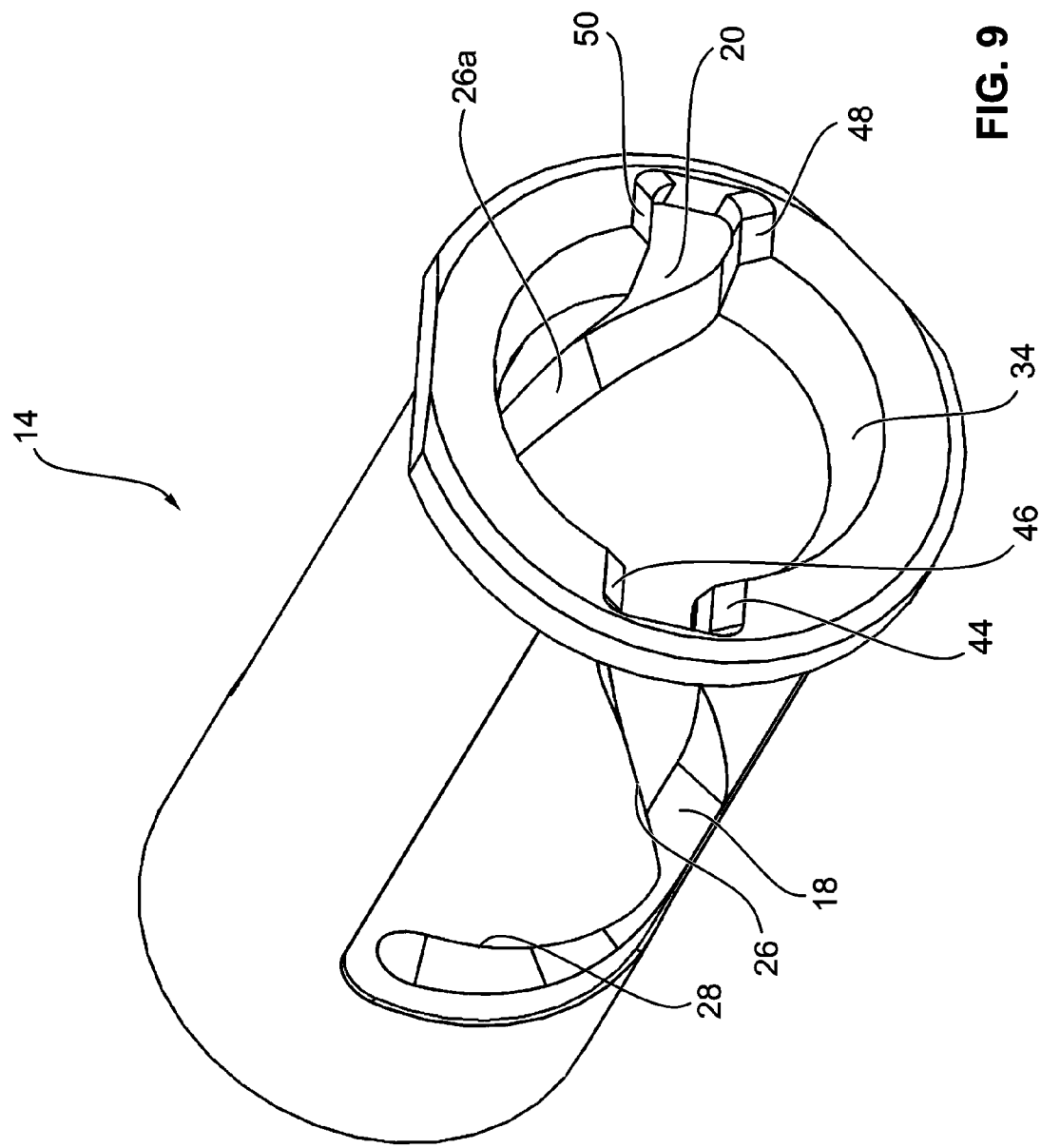
FIG. 9 shows a perspective view of a bushing for receiving a connecting element.
Figure 10:
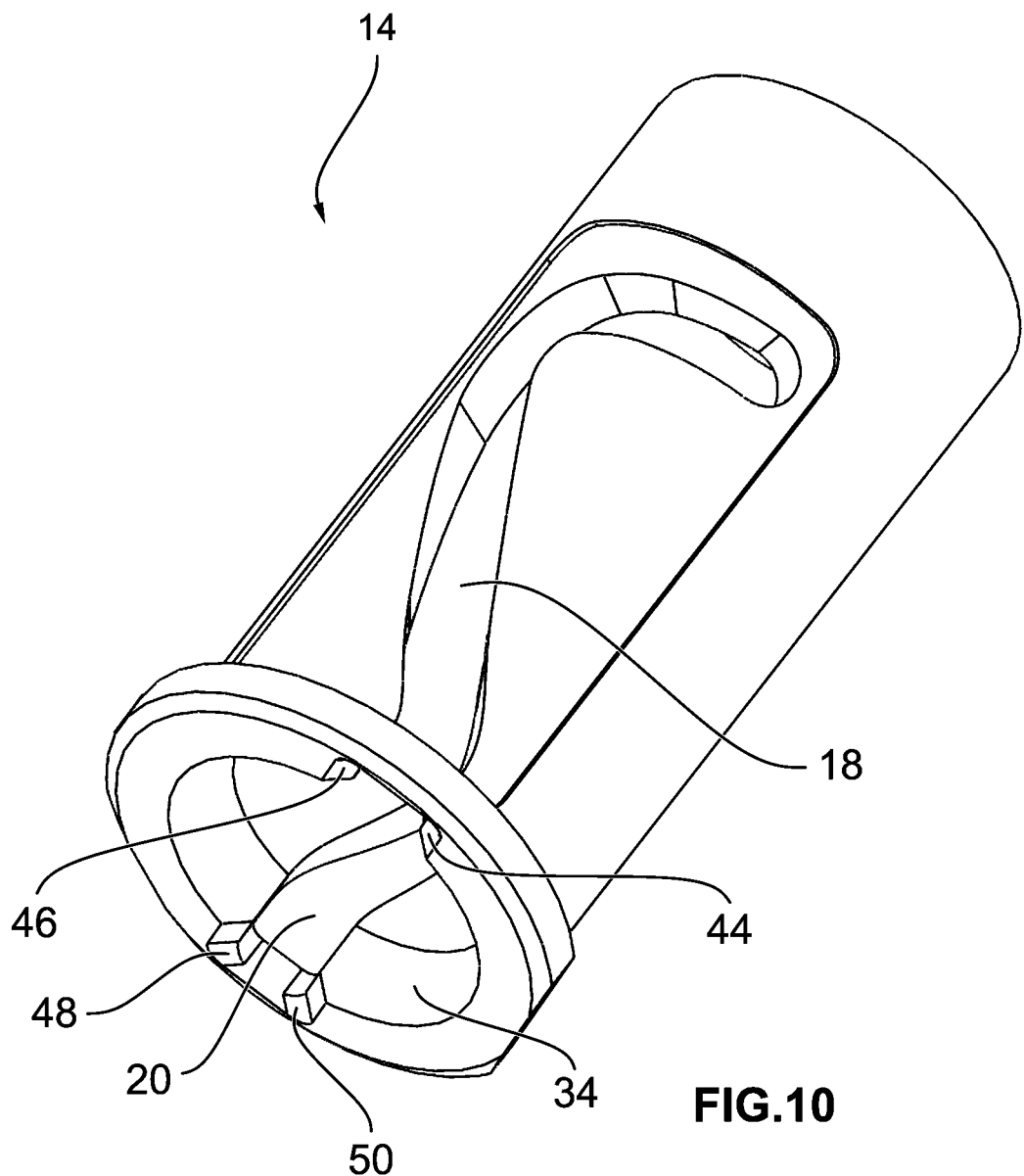
FIG. 10 shows a second perspective view of the bushing according to FIG. 9.
Figure 11:
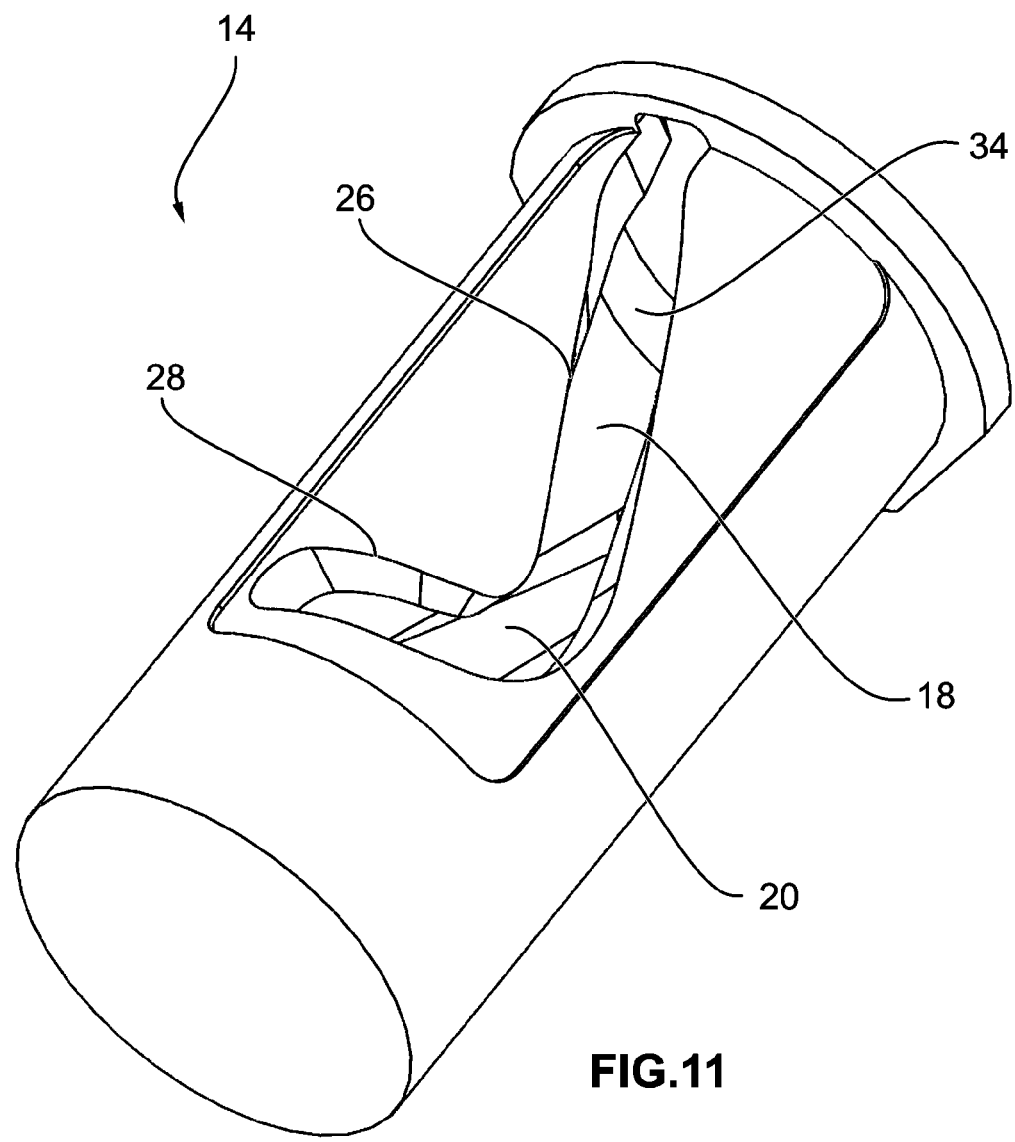
FIG. 11 shows a third perspective view of the bushing according to FIGS. 9 and 10.

In FIGS. 9 to 11, further perspective views of the bushing 14 are shown.

While the present invention has been illustrated and described with respect to a particular embodiment thereof, it should be appreciated by those of ordinary skill in the art that various modifications to this invention may be made without departing from the spirit and scope of the present.

What is claimed is:

1. An arrangement for connecting an accessory part to an operating table, the arrangement comprising:
   a connecting element adapted to be connected to the accessory part, the connecting element having a substantially cylindrical portion with a hollow interior, at least one opening into the hollow interior being formed in a circumferential surface of the cylindrical portion;
   an engagement element having an inner cylinder rotationally disposed within the hollow interior of the connecting element and having at least one cylindrical pin that projects radially outward from the inner cylinder and through the at least one opening of the connecting element;
   an elastically deformable element disposed within the hollow interior of the connecting element, the elastically deformable element resisting rotation of the engagement element within the hollow interior of the connecting element;
   a component part having a receiving are for receiving at least and area of the substantially cylindrical portion of the connecting element, the component part adapted to be connected to the operating table;
   wherein the receiving are has a guideway with which the at least one cylindrical pin of the engagement element engages during insertion of the at least an area of the substantially cylindrical portion of the connecting element into the receiving area, wherein the guideway has a rising area and a falling area;
   wherein upon insertion of the connecting element into the receiving area the engagement element is rotated within the hollow interior against the force of the elastically deformable element by engagement of the at least one cylindrical pin with the rising area of the guideway, and
   wherein the elastically deformable element, when deformed, exerts a force on the engagement element, wherein by means of the force exerted on the engagement element and by the course of the guideway, when the at least one cylindrical pin of the engagement element engages the falling area of the guideway, a force $F_A$ acts in the direction of insertion (P2) on the connecting element when the accessory part and the operating table are connected.

2. The arrangement according to claim 1, wherein the connecting element is formed as a pin and wherein the receiving area is formed as a bushing into which the pin can be inserted.

3. The arrangement according to claim 2, wherein an end of the pin to be inserted into the bushing is tapered.

4. The arrangement according to claim 2, wherein an end of the pin to be inserted into the bushing has a circumferential chamfer.

5. The arrangement according to claim 1, wherein the force acting in the direction of insertion presses a first contact area of the connecting element against a second contact area of the receiving area.

6. The arrangement according to claim 5, wherein the first contact area or the second contact area are formed by at least a part of a circumferential surface of a conical frustum, the longitudinal axis of which runs parallel to the direction of insertion (P2), and wherein, in a connected state of the accessory part and the operating table, the respective other contact area is formed, at least in a partial area, complementarily to the circumferential surface of the conical frustum.

7. The arrangement according to claim 1, wherein by way of the rising area of the guideway, upon insertion of the connecting element into the receiving area, a rotation of the engagement element about an axis of rotation running parallel to the direction of insertion (P2) in a first direction of rotation (P1) takes place, wherein the elastically deformable element is deformed upon rotation of the engagement element in the first direction (P1), and wherein, by the way of the falling area of the guideway, the engagement element is rotated in a second direction of rotation opposite to the first direction of rotation (P1) after passing the first rising area, wherein the elastically deformable element, upon deformation, exerts a force on the receiving area via the engagement element and the guideway, wherein this force is split up into an axial force ($F_A$) in the direction of insertion (P2) and into a radial force ($F_R$) in the second direction of rotation by the second falling area of the guideway, wherein by the force ($F_A$) acting in the direction of insertion (P2) the connecting element is held in the receiving area and/or pulled into the receiving area.

8. The arrangement according to claim 1, wherein a lever is provided which is connected to the engagement element in a rotationally fixed manner, wherein for releasing the connection between the connecting element and the receiving area the engagement element can be rotated with the aid of the lever in the first direction of rotation (P1) so that upon actuation of the lever the connecting element can be moved out of the receiving area opposite to the direction of insertion (P2).

* * * * *

UNITED STATES PATENT AND TRADEMARK OFFICE
CERTIFICATE OF CORRECTION

PATENT NO. : 8,931,973 B2
APPLICATION NO. : 12/947345
DATED : January 13, 2015
INVENTOR(S) : Jan Donat Olszewski It is certified that error appears in the above-identified patent and that said Letters Patent is hereby corrected as shown below:

In the Claims:

Claim 1, Column 9, line 61, please delete the word "are" and replace with --area--.

Claim 1, Column 9, line 62, please delete the word "and" and replace with --an--.

Claim 1, Column 9, line 65, please delete the word "are" and replace with --area--.

Claim 1, Column 10, line 3, please add the word "and" after "area;".

Signed and Sealed this
Eighteenth Day of August, 2015

Michelle K. Lee
*Director of the United States Patent and Trademark Office*